US012613205B2

(12) United States Patent
Wang et al.

(10) Patent No.: US 12,613,205 B2
(45) Date of Patent: Apr. 28, 2026

(54) SYSTEMS AND METHODS FOR PERFORMING DIFFERENTIAL SCANNING CALORIMETRY (DSC) MEASUREMENT OF BATTERY CELLS

(71) Applicant: GM GLOBAL TECHNOLOGY OPERATIONS LLC, Detroit, MI (US)

(72) Inventors: Lei Wang, Rochester Hills, MI (US); Jingyuan Liu, Shanghai (CN); Mengyuan Chen, Madison Heights, MI (US); Michelle H. Wiebenga, Farmington Hills, MI (US); Bradley R. Frieberg, Farmington Hills, MI (US); Qili Su, Shanghai (CN); Meiyuan Wu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 507 days.

(21) Appl. No.: 18/134,645

(22) Filed: Apr. 14, 2023

(65) Prior Publication Data

US 2024/0219330 A1 Jul. 4, 2024

(30) Foreign Application Priority Data

Dec. 29, 2022 (CN) .......................... 202211705360.2

(51) Int. Cl.
*G01N 25/20* (2006.01)

(52) U.S. Cl.
CPC .................................... *G01N 25/20* (2013.01)

(58) Field of Classification Search
CPC ... G01N 25/20; G01N 25/486; G01N 25/4866

USPC .............................................................. 374/12
See application file for complete search history.

(56) References Cited

U.S. PATENT DOCUMENTS

| | | | |
|---|---|---|---|
| 6,833,707 | B1 | 12/2004 | Dahn et al. |
| 2003/0129495 | A1* | 7/2003 | Yamato ................. H01M 4/525 |
| | | | 429/223 |
| 2017/0074731 | A1 | 3/2017 | Santhanagopalan et al. |
| 2019/0198937 | A1 | 6/2019 | Jung et al. |
| 2020/0371054 | A1 | 11/2020 | Ren et al. |

FOREIGN PATENT DOCUMENTS

| | | | | |
|---|---|---|---|---|
| CN | 110501382 | A | 11/2019 | |
| CN | 111426724 | A * | 7/2020 | ............. G01N 25/20 |
| CN | 112098861 | A | 12/2020 | |
| CN | 111624128 | B | 4/2021 | |
| CN | 113588708 | A | 11/2021 | |
| CN | 120102647 | A * | 6/2025 | ............. G01N 27/00 |
| JP | 200328820 | A | 1/2003 | |
| JP | 2016217952 | A | 12/2016 | |

OTHER PUBLICATIONS

U.S. Appl. No. 17/522,553, filed Nov. 9, 2021, Wang et al.
U.S. Appl. No. 17/882,936, filed Aug. 8, 2022, Qi et al.
U.S. Appl. No. 18/073,021, filed Dec. 1, 2022, Wiebenga et al.
Office Action dated Apr. 24, 2023 from German Patent Office for German Patent Application No. 102023105675.1; 4 pages.

* cited by examiner

*Primary Examiner* — Mirellys Jagan

(57) ABSTRACT

A method for testing a sample of a battery cell includes arranging the sample of the battery cell in a sample pan of a test crucible; arranging a spacer on the sample of the battery cell; sealing the sample pan; and performing differential scanning calorimetry (DSC) testing of the sample.

20 Claims, 7 Drawing Sheets

300

310

314

318

322

324

328

332

334

338

342

346

SYSTEMS AND METHODS FOR PERFORMING DIFFERENTIAL SCANNING CALORIMETRY (DSC) MEASUREMENT OF BATTERY CELLS

CROSS-REFERENCE TO RELATED APPLICATIONS

This application claims the benefit of Chinese Patent Application No. 202211705360.2, filed on Dec. 29, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for testing battery cells, and more particularly to systems and methods for testing battery cells using differential scanning calorimetry (DSC) testing.

Electric vehicles (EVs) such as battery electric vehicles (BEVs), hybrid vehicles, and/or battery cell vehicles include one or more electric machines and a battery system including one or more battery cells, modules and/or packs. A power control system is used to control charging and/or discharging of the battery system during charging and/or driving.

Each battery cell includes one or more anode electrodes, cathode electrodes, and/or separators. Manufacturers of EVs are pursuing increased power density to increase the performance and/or range of the EVs. Testing of one or more layers of battery cells is typically performed to optimize battery chemistry and/or ratios of material to enhance performance of the battery cells.

SUMMARY

A method for testing a sample of a battery cell includes arranging the sample of the battery cell in a sample pan of a test crucible; arranging a spacer on the sample of the battery cell; sealing the sample pan; and performing differential scanning calorimetry (DSC) testing of the sample.

In other features, the method includes arranging an insulating layer on the spacer prior to sealing the sample pan. The method includes arranging the sample of the battery cell in the sample pan includes arranging a first electrode including a first current collector and a first electrode coating in the sample pan of the test crucible with the first current collector in contact with the sample pan; arranging a separator on the first electrode in the sample pan; adding electrolyte to the sample pan; and arranging a second electrode including a second current collector and a second electrode coating in the sample pan on the separator with the second current collector in contact with the spacer.

In other features, the test crucible further includes a first lid. The sample pan and the first lid include mating threads. Sealing the sample pan using the first lid further comprises arranging a seal between the sample pan and the first lid; and fastening the first lid to the sample pan using the threads. In other features, the sample pan and the first lid include stainless steel and the seal includes gold.

In other features, the test crucible further includes a first lid. The method includes sealing the sample pan using the first lid further comprises press fitting the first lid to the sample pan. The sample pan and the first lid are made of aluminum. The test crucible further includes a first lid and a second lid, and sealing the sample pan using the first lid further comprises press fitting the first lid to the sample pan and press fitting the second lid to the sample pan over the first lid.

In other features, the sample pan, the first lid and the second lid are made of aluminum. The sample of the battery cell is charged to a predetermined state of charge that is greater than zero prior to testing. Performing DSC testing includes increasing a temperature of the sample between a first temperature and a second temperature using one of a linear thermal ramp and a plurality of isothermal steps. The spacer includes a material selected from a group consisting of polymer, gold, platinum, aluminum, nickel, stainless steel, and oxide.

In other features, the test crucible further includes a first lid. The insulating layer includes a material selected from a group consisting of a polymer film layer, a polymer gasket, and an insulating coating formed on at least one of the separator and the first lid.

A method for testing a sample of a battery cell includes arranging a first electrode including a first current collector and a first electrode coating in a sample pan of a test crucible with the first current collector in contact with the sample pan; arranging a separator on the first electrode in the sample pan; adding electrolyte to the sample pan; arranging a second electrode including a second current collector and a second electrode coating in the sample pan on the separator; arranging a spacer on the second current collector of the second electrode; arranging an insulating layer on the spacer; and sealing the sample pan. The sample of the battery cell is charged to a predetermined state of charge that is greater than zero. The method includes performing differential scanning calorimetry (DSC) testing using the sample pan.

In other features, the test crucible further includes a first lid, the sample pan and the first lid include mating threads, and sealing the sample pan using the first lid further comprises arranging a seal between the sample pan and the first lid; and fastening the first lid to the sample pan using the threads.

In other features, the sample pan and the first lid include stainless steel and the seal includes gold. The test crucible further includes a first lid and sealing the sample pan using the first lid further comprises press fitting the first lid to the sample pan.

In other features, the test crucible further includes a first lid and a second lid and sealing the sample pan using the first lid further comprises press fitting the first lid to the sample pan and press fitting the second lid to the sample pan over the first lid. Performing DSC testing includes increasing a temperature of the sample between a first temperature and a second temperature using one of a linear thermal ramp and a plurality of isothermal steps.

In other features, the test crucible further includes a first lid, the spacer includes a material selected from a group consisting of a polymer, gold, platinum, aluminum, nickel, stainless steel, and oxide, and the insulating layer includes a material selected from a group consisting of a polymer film layer, a polymer gasket, and an insulating coating formed on at least one of the separator and the first lid.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 2:
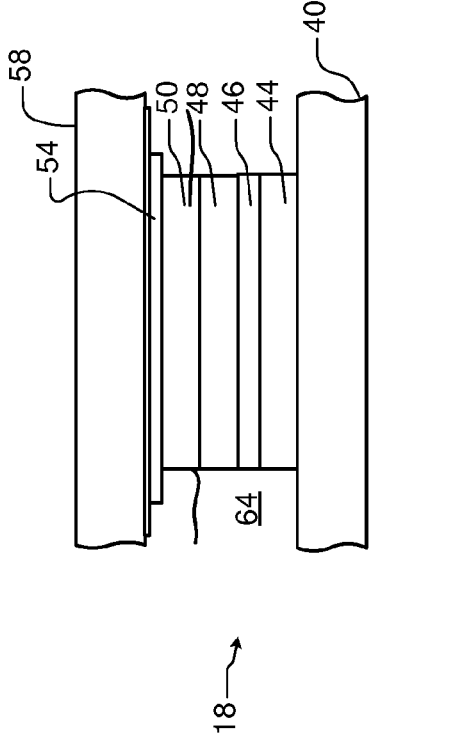
FIG. 2 is a partial side view of an example of a test crucible including a sample pan, a sample, and a lid according to the present disclosure.
Figure 2:

Systems and methods according to the present disclosure perform differential scanning calorimetry (DSC) testing of portions of battery cells. For example, the DSC testing may be performed on an anode, cathode, separator, and electrolyte of a battery cell. DSC testing of the anode, cathode, separator, and electrolyte of the battery cell is performed at the same time rather than separate testing of the anode, cathode, separator, and electrolyte.

DSC testing of battery cells as described herein enables analysis of full battery cell thermal properties on a small scale. The systems and methods for performing DSC testing according to the present disclosure provide a low-cost and time-efficient method for thermal analysis of the battery cell. The systems and methods for performing DSC testing according to the present disclosure provide inputs for thermal runaway modeling and/or cell chemistry screening.

Differential scanning calorimetry (DSC) testers are used to measure heat changes for phase transitions (e.g., melting temperature, glass transition temperature, or other phase transitions) of materials or chemical reactions or decomposition (e.g., specific heat, heat of reaction, and onset temperatures of reactions). The DSC tester includes a sample crucible and a reference crucible that are heated at the same time and in the same manner. The sample crucible and the reference crucible typically include a test crucible including a pan and a lid. There are different pans and lids for testing solids and liquids.

The sample to be tested is arranged in the sample pan of the sample crucible. The reference crucible serves as a reference and does not include a sample during testing. The DSC tester does not measure absolute heat. Rather, the DSC tester determines a difference in heat that is required to increase the temperature of the sample in the sample crucible relative to the reference crucible.

The DSC tester heats the sample crucible and the reference crucible at the same time using one or more heaters. During heating, temperatures of the sample crucible and the reference crucible are monitored using one or more thermocouples. The sample in the sample crucible is preferably in intimate thermal contact with a bottom surface of the sample pan. Generally, some amount of pressure should be exerted by the sample against the sample pan. If there is an air or gas gap between the sample and the bottom surface of the sample pan, heat loss occurs, and the DSC measurement will be less accurate.

The sample crucible and the reference crucible may be made of a soft metal such as aluminum. The lid is press fit onto the sample pan after the sample is arranged in the sample pan. The lid is also press fit onto the reference pan. However, harder materials such as stainless steel can be used, and the sample pan and the lid can include threads and a seal.

The DSC testers normally test samples (e.g., solid metals, polymer powders, liquids, etc.) that can be cut to size or allow a specific volume to be selected such that intimate thermal contact occurs. However, the present disclosure relates to testing sample portions of battery cells. The sample portions of the battery cell have an intrinsic height that may or may not match a height of the test crucible when the lid is attached to the sample pan. Therefore, intimate thermal contact between the sample portions of the battery cell and the bottom surface of the sample pan is not necessarily a given.

Some tests require the battery cell to be charged to a predetermined state of charge (SOC) prior to DSC testing. However, the test crucibles are typically made of metal that would short the battery cell. Therefore, the battery cell samples are insulated from one or both surfaces of the test crucible to prevent short circuits.

The mass of the sample is measured before the DSC measurement to allow the measurement of specific heat (Watts/gram (W/g)). In other words, the heat to increase the temperature of the sample depends upon the amount/mass of the sample (the mass does not change during the measurement since the test crucible is sealed).

Battery materials in the battery cell samples release gases when heated and phase transitions occur. The test crucible is sealed for the duration of the DSC test to prevent the release of gas. When the test crucible is made of softer materials such as aluminum, the pans expand due to the gases and leak or burst during testing. In some of the examples, below, test crucibles made of softer materials such as aluminum are designed to withstand higher gas pressures (e.g., pans with higher volume and/or enhanced sealing). For example, larger volume pans are used to allow the gas pressure to build up more slowly to prevent leaks. The use of larger volume pans also allows the lid of the test crucible to expand upwardly further when gas is released before bursting or breaking the seal.

In other examples, high-pressure test crucibles that are made of harder materials such as stainless steel are used. However, standard crimping methods cannot be used to seal the high-pressure test crucibles. As will be described further below, the pan and the lid include threads and a seal is used.

Figure 1:
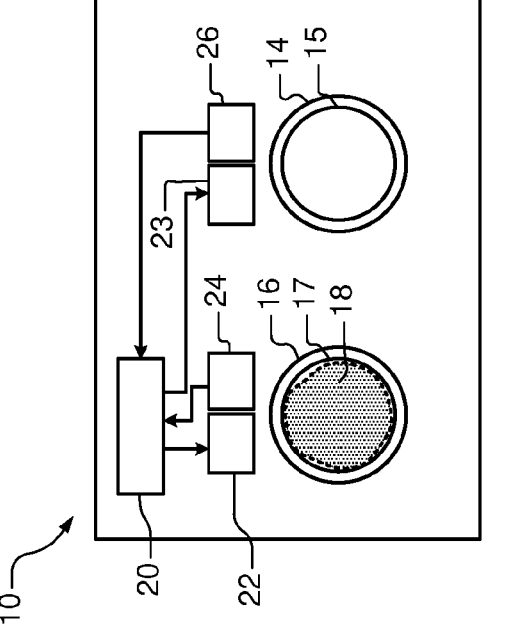
FIG. 1 is a functional block diagram of an example of a differential scanning calorimetry (DSC) tester according to the present disclosure.

Referring now to FIG. 1, a differential scanning calorimetry (DSC) tester 10 is shown. The DSC tester 10 includes a reference crucible including a reference pan 14 and reference lid 15 and a sample crucible including a sample pan 16 and sample lid 17. A sample 18 of the battery cell is arranged in the sample pan 16. The sample lid 17 encloses the sample pan 16. The sample pan 16 and the sample lid 17 are made of the same material and have the same or similar dimensions as the reference pan 14 and the reference lid 15 so that they behave similarly when heated.

A controller 20 supplies power to one or more heaters 22, 23 to heat the reference pan 14 and the reference lid 15 at the same time and in the same manner as the sample pan 16, the sample lid 17, and the sample 18. One or more thermocouples 24, 26 are used to monitor the temperatures of the reference pan 14 and the reference lid 15, and the sample pan 16, the sample lid 17, and the sample 18. The controller 20 monitors power output that is required to increase the temperature of the reference pan 14 and the reference lid 15 and the sample pan 16, the sample lid 17, and the sample 18.

In some examples, the sample 18 includes one or more layers of a battery cell. In some examples, the layers of the battery cell include an anode electrode including anode current collector and an anode coating (e.g., including anode active material, a binder, an additive, and/or a solvent), a cathode electrode including cathode current collector and a cathode coating (e.g., including cathode active material, a binder, an additive, and/or a solvent), a separator, and/or electrolyte (e.g., including a solvent and a lithium salt). Alternately, the sample 18 can include one or more layers of the battery cell.

Referring now to FIG. 2, the sample 18 is arranged on an upper surface 40 of a sample pan. In some examples, the sample 18 includes an anode electrode 44, a separator 46, a cathode electrode 48, and electrolyte 64. However, the sample 18 may include one or more layers of a battery cell.

In some examples the mass ratio of the sample 18 includes cathode electrode in a range from 45 to 55% of the mass of the sample, an anode electrode in a range from 25 to 35% of the mass of the sample, and electrolyte in a range from 15 to 25% of the mass of the sample, although other ratios can be used. The battery cell may have any type of battery cell chemistry. The charge status of the battery cell can be any state of charge (SOC). The battery cell can be a new battery cell or an aged battery cell.

When an aged battery cell is used, the sample is assembled into a half cell (vs. Li metal) or a full cell (cathode vs. anode). The battery cell is cycled for a desired number of cycles using a predetermined charge rate (e.g., C/100-6C) or voltage within a predetermined voltage window (e.g., 0V to 5V). The battery cell is charged and/or discharged to a desired state of charge (SOC) (0% to 100%) or voltage (0V to 5V). The battery cells are disassembled in a glovebox such as an Argon (Ar) filled glovebox and the electrodes are harvested. The electrodes are rinsed in a solvent such as dimethyl carbonate (DMC) and the electrodes are dried. The electrodes are punched into test pieces having a predetermined size for DSC testing (e.g., round, square or other shape). The samples are arranged in the sample pan and sealed therein as described further below. A spacer 50 and an insulating layer 54 are arranged between the sample 18 and a bottom surface 58 of the lid. Electrolyte 64 is arranged in the pan.

When using a pristine battery cell, the electrodes are punched into pieces having a predetermined size for DSC testing (e.g., round, square or other shape). The samples are arranged in the sample pan and sealed therein as described further below.

In some examples, the spacer 50 is made of a material selected from a group consisting of a stainless steel (e.g., SS304, SS316, etc.), polymer (e.g., polypropylene, polyester, styrene-acrylonitrile copolymer), metal such as gold, platinum, aluminum, nickel or other metal, and/or oxide (e.g., aluminum oxide). In some examples, the insulating layer 54 is selected from a group consisting of a polymer layer, a polymer gasket, and/or an insulating coating formed on the separator or lid.

The weight of the spacer 50 applies pressure on the sample 18 against the sample pan. In addition, the thickness of the spacer 50 can be selected such that the height of the spacer 50, the insulating layer 54 and the sample 18 is equal to or slightly greater than an inner height of the test crucible when sealed such that the lid also presses the sample 18 against the sample pan. In some examples, the spacer is made of an insulator and the insulating layer is omitted.

Figures 3, 4A, 4B:
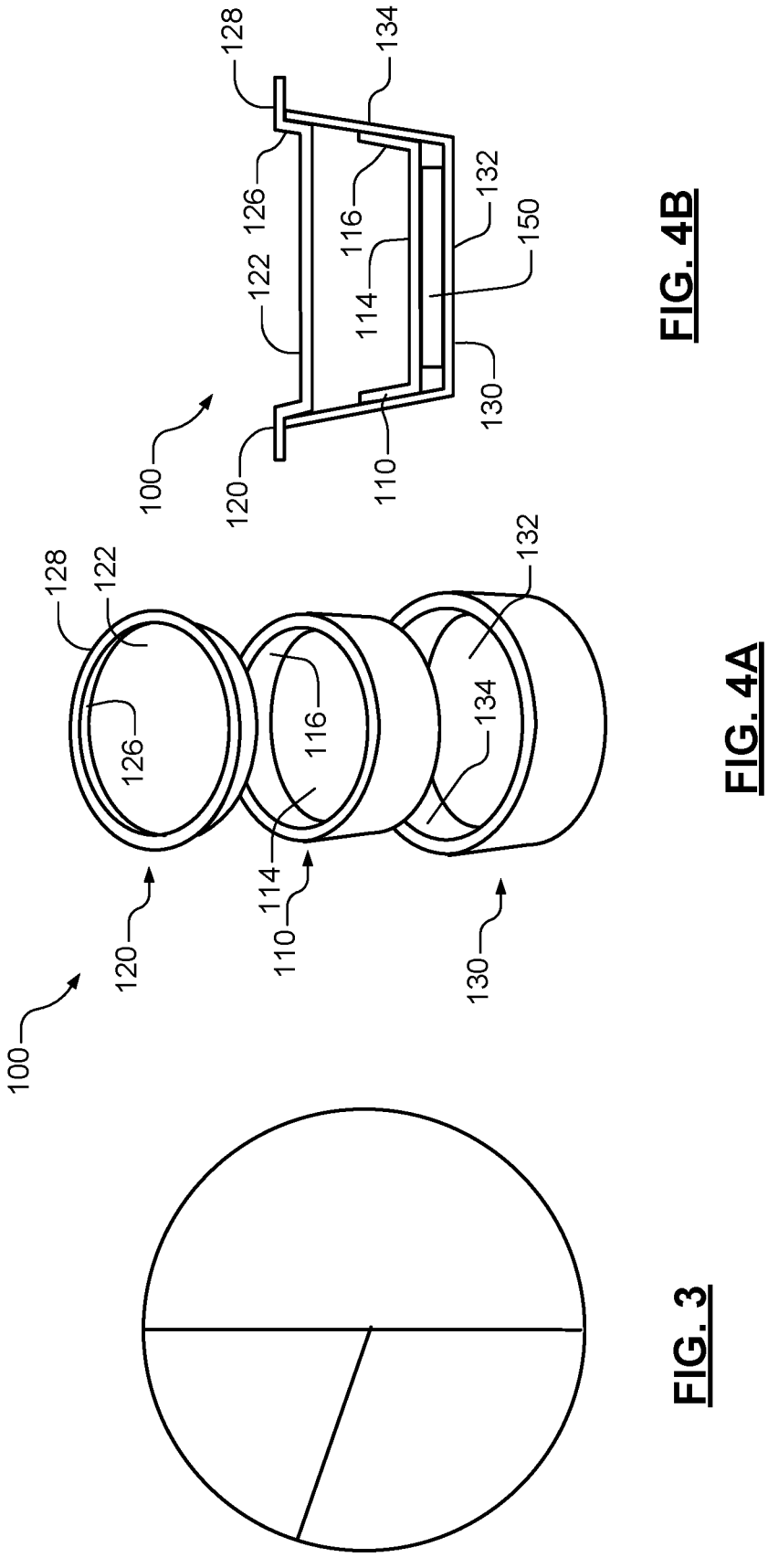
FIG. 3 is a pie chart illustrating an example a material mass ratio of a battery cell to be tested.
FIG. 4A is a perspective view of an example of a test crucible including a sample pan, a first lid, and a second lid according to the present disclosure.
FIG. 4B is a side cross-sectional view of the test crucible of FIG. 4A.

Referring now to FIG. 3, a pie chart illustrates sample chemistry of a battery cell. In this example, the anode electrode comprises 30% wt, the cathode electrode comprises 50% wt, and electrolyte comprises 20% wt of the sample 18. However, the sample may have another composition.

Referring now to FIGS. 4A and 4B, a testing assembly 100 includes a first lid 110, a second lid 120, and a pan 130. The first lid 110 includes a bottom surface 114 and side walls 116 extending upwardly from the bottom surface 114. The second lid 120 includes a bottom surface 122, side walls 126 extending upwardly from the bottom surface 122, and a flange 128 extending radially outwardly from the side walls 126. The pan 130 includes an upwardly facing surface 132 and side walls 134 extending upwardly from the upwardly facing surface 132.

The sample 18, the spacer 50, the insulating layer 54, and the electrolyte 64 are arranged in the pan 130 before press fitting the first lid 110. After press-fitting, the spacer and/or the first lid 110 bias the sample 18 into the upwardly facing surface 132 of the pan 130 to provide intimate thermal contact there between as best seen in FIG. 4B. The second lid 120 is press fit into the pan 130 above the first lid 110. For the reference crucible, the first lid 110 and the second lid 120 are press fit into the pan 130 without a sample located there between. In some examples, the spacer and the insulating layer can be arranged in the pan 130 for the reference crucible.

Figure 5A:
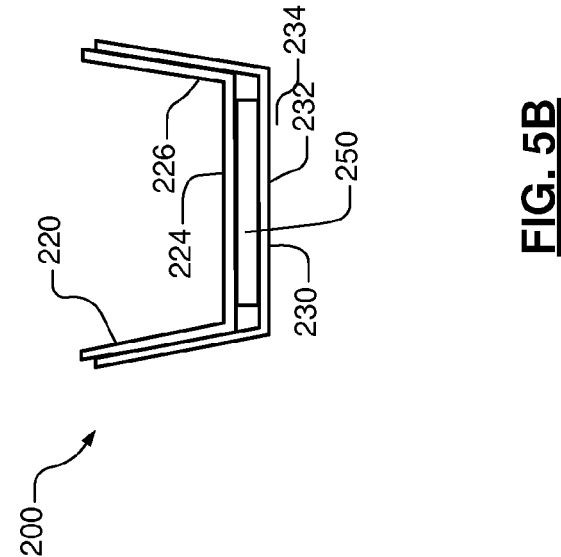
FIG. 5A is a perspective view of another example of test crucible including a sample pan and a lid according to the present disclosure.
Figure 5B:
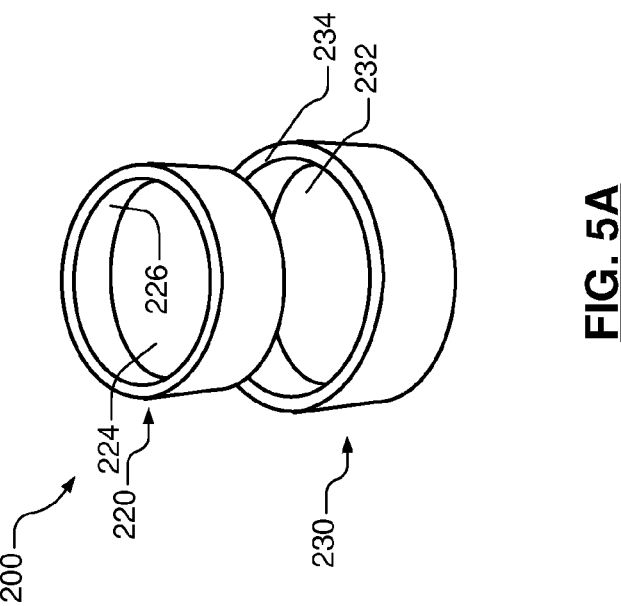
FIG. 5B is a side cross-sectional view of the test crucible of FIG. 5A.

Referring now to FIGS. 5A and 5B, a testing assembly 200 includes a lid 220 and a pan 230. The lid 220 includes a bottom surface 224 and side walls 226 extending upwardly from the bottom surface 224. The pan 130 includes an upwardly facing surface 232 and side walls 234 extending upwardly from the upwardly facing surface 232. The lid 220 is press fit into the pan 230. In some examples, the pan 230 and the lid 220 have increased surface area that is in contact. In some examples, the side surface of the lid 220 extends beyond the side walls 234 of the pan 230 when the lid 220 is press fit into the pan 230.

The sample 150, the spacer 50, the insulating layer 54, and the electrolyte 64 are arranged in the pan 230 before press fitting the lid 220. After press-fitting, the spacer and/or the lid 220 bias the sample 150 into the upwardly facing surface 232 of the pan 230 to provide intimate thermal contact there between as best seen in FIG. 5B. For the reference pan, the lid 220 is press fit into the pan 230 without a sample 250 located there between. In some examples, the spacer and the insulating layer can be arranged in the pan 230 for the reference crucible.

Figure 6B:
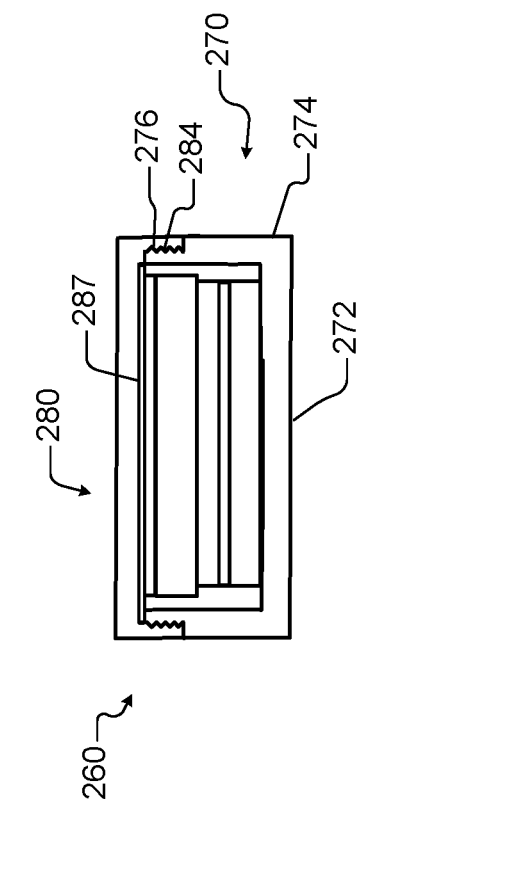
FIG. 6B is a side cross-sectional view of the test crucible of FIG. 6A.
Figure 6A:
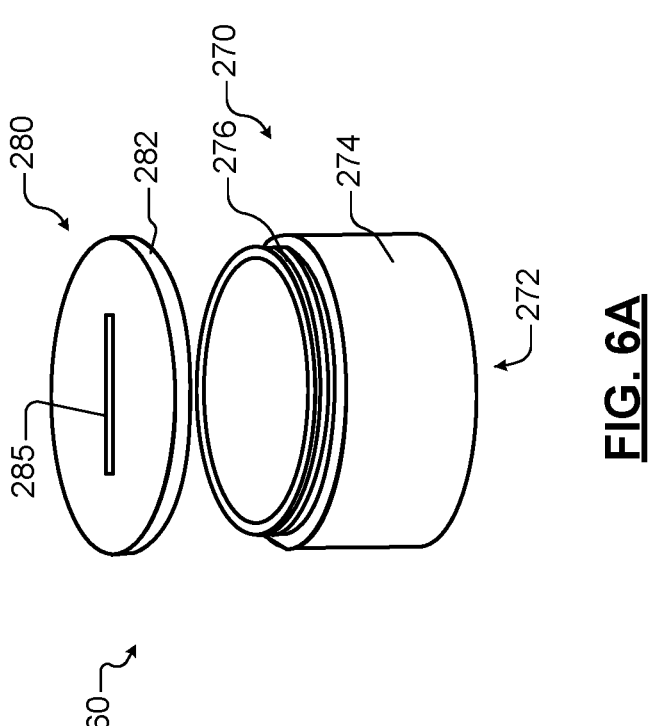
FIG. 6A is a perspective view of another example of a test crucible including a sample pan, a sample, a seal, and a lid according to the present disclosure.

Referring now to FIGS. 6A and 6B, another testing assembly 260 is shown to include a pan 270 including a bottom 272, side walls 274 extending from the bottom surface, and threads 276 located on an outer surface (FIGS. 6A and 6B) of the side walls 274. A lid 280 includes side walls 282 and threads 284 located on an inner surface of the side walls 282. The sample, the spacer, and the insulator are arranged in the pan 270. The lid 280 is threaded into the pan 270 and rotated. A seal 287 such as a rubber O-ring and/or a flat cylinder seal may be arranged between the lid 280 and the pan 270. In some examples, the seal 287 is made of a soft metal such as aluminum or gold.

The spacer and/or the lid 280 apply pressure on the sample to ensure intimate thermal contact between the sample and an upper surface of the bottom 272 of the pan 270. In some examples, the lid 280 includes a slot 285 or an outer surface has a hexagonal shape to allow the lid 280 to be removed using a tool.

Figure 7:
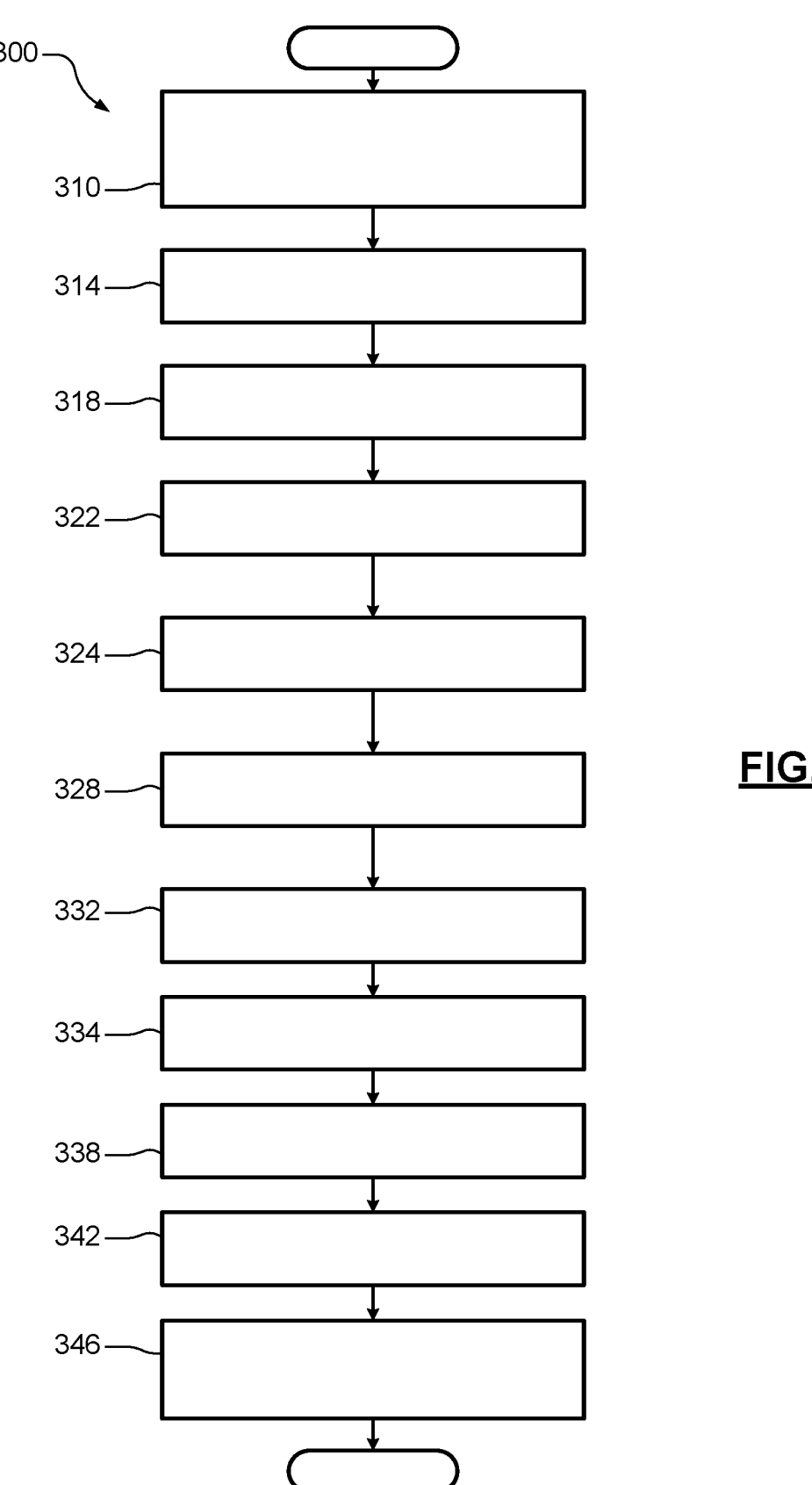
FIG. 7 is a flowchart of an example of a method for performing differential scanning calorimetry (DSC) testing of a sample battery cell according to the present disclosure.

Referring now to FIG. 7, a flowchart of a method 300 for using differential scanning calorimetry (DSC) to test a battery cell is shown. At 310, the total mass of testing assembly (pan, lids, separator, insulator) and individual masses of anode, separator, and cathode are measured.

At 314, a cathode electrode is arranged in the pan with a current collector facing the pan. At 318, a separator is arranged on top of the cathode electrode in the pan. At 322, a predetermined amount of electrolyte is added to the pan. At 324, an anode electrode is arranged on the separator with the anode current collector facing the lid.

At 328, a spacer is arranged on the anode current collector. At 332, an insulator is arranged on the spacer and a seal is arranged on the spacer. At 334, the pan is covered with one or more lids. At 338, the pan is sealed with a sealing tool (one or more times depending on the number of lids). At 342, the total mass of the pan and the sample is measured.

At 346, the temperature is increased from a first temperature to a second temperature with a predetermined ramping rate or using isothermal steps. For example, the temperature can be ramped from −20° C. to 1000° C. with a temperature ramping rate of 1 to 30° C./min. While the anode is located on bottom in this example, the battery cell can be arranged with the cathode on bottom. In some examples, the temperature is increased using a linear thermal ramp. In other examples, isothermal steps are used.

Figure 8:
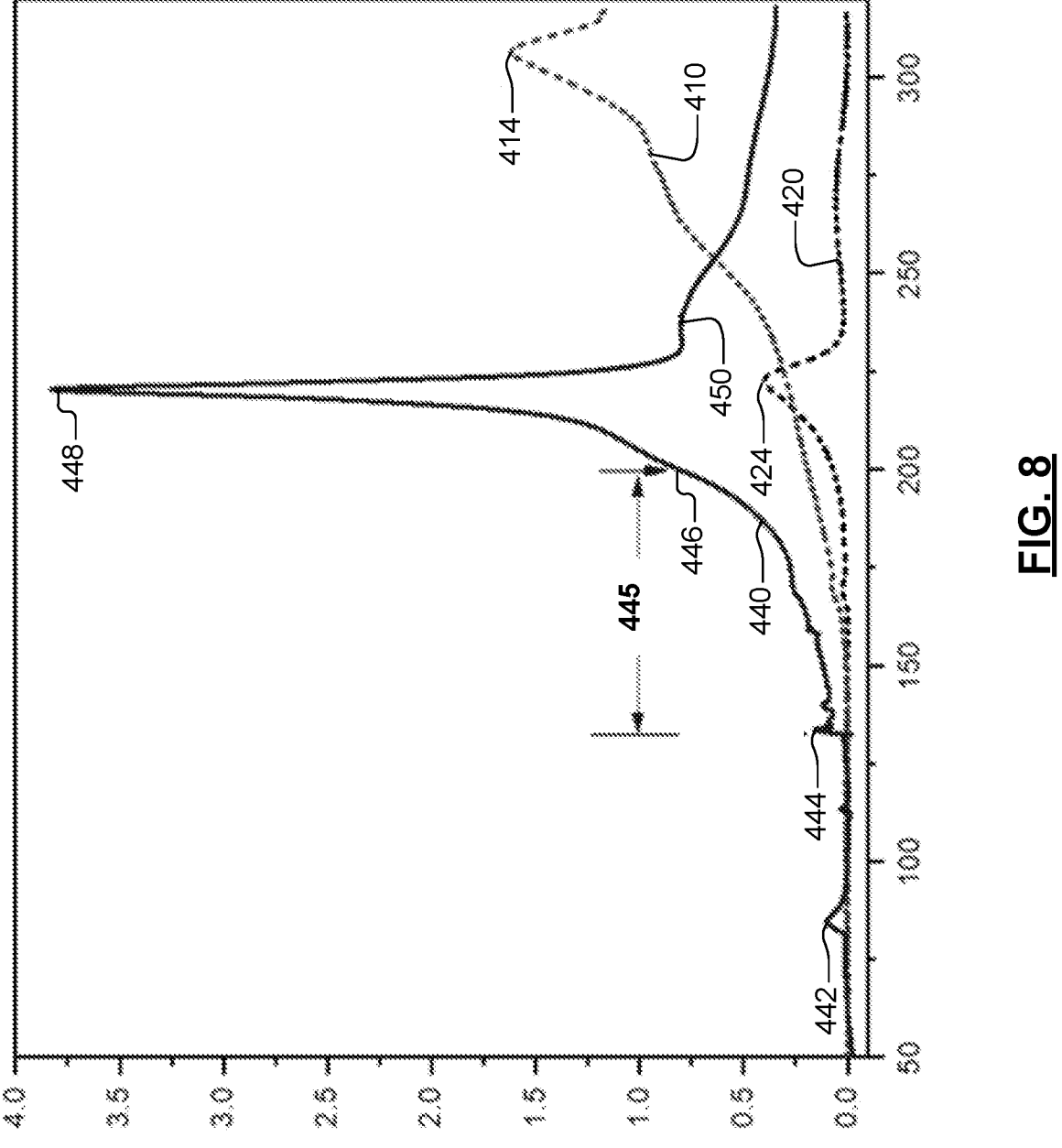
FIG. 8 is a graph illustrating an example of heat flow as a function of temperature for a sample battery cell that is tested using the DCS tester according to the present disclosure.
Figure 9:
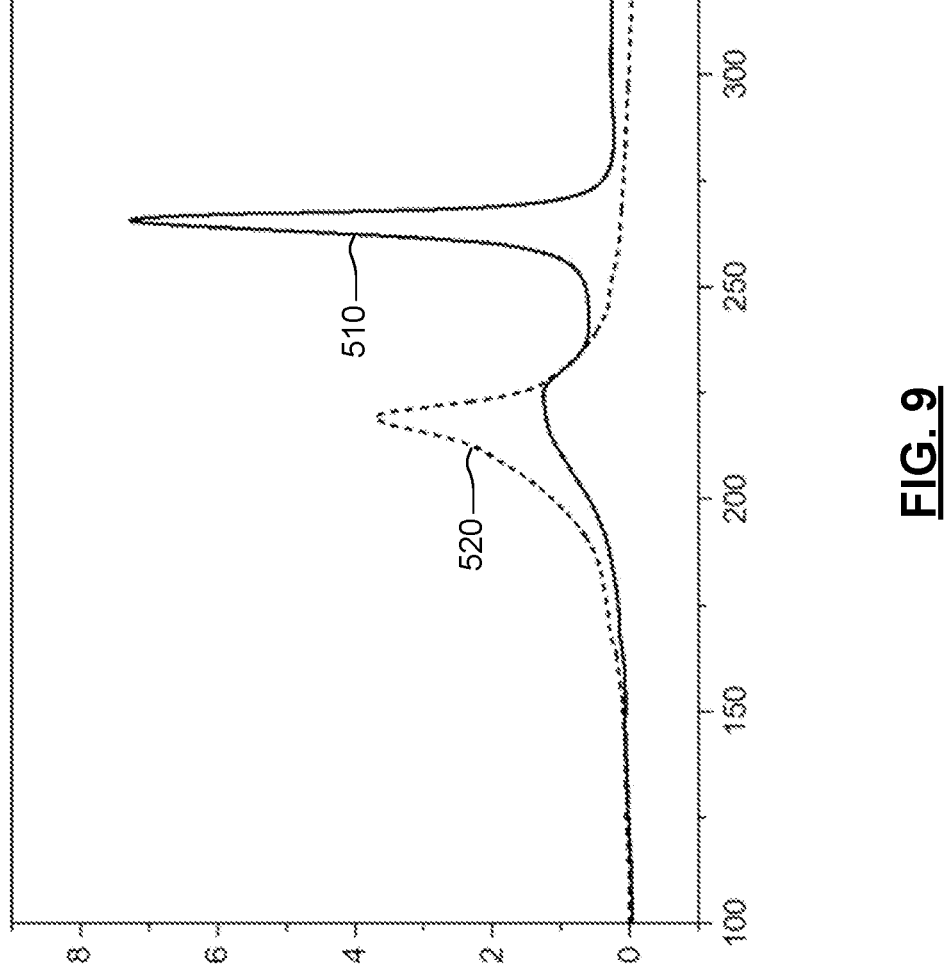
FIG. 9 is a graph illustrating an example of heat flow as a function of temperature for sample battery cells having different chemistry that are tested using the DCS tester according to the present disclosure.

Referring now to FIGS. 8 and 9, heat flow is shown as a function of temperature for a battery cell that is tested using the DCS tester. The heat flow can be used to identify interactions among the different battery materials of the battery cell during heating. In FIG. 8, heat flows are shown for DSC testing of an anode electrode only, a cathode electrode only, and a battery cell including the cathode electrode, the anode electrode, the separator, and electrolyte.

During testing of the anode electrode only, a heat flow 410 shows a heat release at 414 corresponding to anode decomposition. During testing of the cathode electrode only, a heat flow 420 shows a heat release at 424 corresponding to cathode decomposition. DSC testing of the battery cell (including the cathode electrode, the anode electrode, the separator, and electrolyte) as described herein provides additional information related to interactions among the different battery materials of the battery cell (as compared to separate testing of the individual materials of the battery cell).

For example in FIG. 8, a heat flow 440 for the battery cell includes information relating to other transition events such as an anode/electrolyte reaction at 442 (e.g., 80° ° C. to 120° C.), separator melting at 444 (e.g., at 130° C.), a quick internal short at 446, a micro internal short 445 (between the separator melting and the quick internal short 446) (e.g., at 130° C. to 200° C.), cathode decomposition and electrolyte combustion at 448 (e.g., at 170° C. to 300° C.), and anode/electrolyte decomposition at 450 (e.g., >160° C.). As can be appreciated, some of these chemical reactions or decompositions are not readily detected when testing individual layers of a battery cell.

In FIG. 9, DSC testing can also be used to compare thermal behavior of different cell chemistries. At 510, a heat flow of battery cell having a first chemistry (e.g., lithium manganese rich (LMR)/5.5% silicon oxide graphite (Si—Ox-Gra)) is shown. At 520, a heat flow of battery cell having a second chemistry (e.g., nickel-cobalt-manganese-aluminum (NCMA)/5.5% Si—Ox-Gra) is shown. The DSC testing can be performed on battery cells in an uncharged state and/or having various states of charge (SOCs). For example in FIG. 9, the SOC of the first and second battery cells is 100%.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for testing a sample of a battery cell, comprising:
   arranging the sample of the battery cell in a sample pan of a test crucible;
   arranging a spacer on the sample of the battery cell;
   sealing the sample pan; and
   performing differential scanning calorimetry (DSC) testing of the sample relative to a reference crucible, wherein the reference crucible does not include a reference sample during the DSC testing.

2. The method of claim 1, wherein the sample of the battery cell is charged to a predetermined state of charge that is greater than zero prior to testing.

3. The method of claim 1, wherein performing DSC testing includes increasing a temperature of the sample between a first temperature and a second temperature using one of a linear thermal ramp and a plurality of isothermal steps.

4. The method of claim 1, wherein the spacer includes a material selected from a group consisting of polymer, gold, platinum, aluminum, nickel, stainless steel, and an oxide.

5. The method of claim 1, wherein:
   the test crucible further includes a first lid;
   the sample pan and the first lid include mating threads, and
   sealing the sample pan using the first lid by:
      arranging a seal between the sample pan and the first lid; and
      fastening the first lid to the sample pan using the threads.

6. The method of claim 5, wherein the sample pan and the first lid include stainless steel and the seal includes gold.

7. The method of claim 1, wherein:
   the test crucible further includes a first lid, and
   sealing the sample pan comprises press fitting the first lid to the sample pan.

8. The method of claim 7, wherein the sample pan and the first lid are made of aluminum.

9. The method of claim 1, wherein:
   the test crucible further includes a first lid and a second lid, and
   sealing the sample pan comprises:
      press fitting the first lid to the sample pan; and
      press fitting the second lid to the sample pan over the first lid.

10. The method of claim 9, wherein the sample pan, the first lid and the second lid are made of aluminum.

11. A method for testing a sample of a battery cell, comprising:
   arranging the sample of the battery cell in a sample pan of a test crucible;
   arranging a spacer on the sample of the battery cell;
   sealing the sample pan;
   performing differential scanning calorimetry (DSC) testing of the sample; and
   arranging an insulating layer on the spacer prior to sealing the sample pan.

12. The method of claim 11, wherein arranging the sample of the battery cell in the sample pan includes:
   arranging a first electrode including a first current collector and a first electrode coating in the sample pan of the test crucible with the first current collector in contact with the sample pan;
   arranging a separator on the first electrode in the sample pan;
   adding electrolyte to the sample pan; and
   arranging a second electrode including a second current collector and a second electrode coating in the sample pan on the separator with the second current collector in contact with the spacer.

13. The method of claim 12, wherein:
   the test crucible further includes a first lid, and
   the insulating layer includes a material selected from a group consisting of a polymer film layer, a polymer gasket, and an insulating coating formed on at least one of the separator and the first lid.

14. A method for testing a sample of a battery cell, comprising:
   arranging a first electrode including a first current collector and a first electrode coating in a sample pan of a test crucible with the first current collector in contact with the sample pan;
   arranging a separator on the first electrode in the sample pan;
   adding electrolyte to the sample pan;
   arranging a second electrode including a second current collector and a second electrode coating in the sample pan on the separator;
   arranging a spacer on the second current collector of the second electrode;
   arranging an insulating layer on the spacer;
   sealing the sample pan,
   wherein the sample of the battery cell is charged to a predetermined state of charge that is greater than zero; and
   performing differential scanning calorimetry (DSC) testing using the sample pan.

15. The method of claim 14, wherein:
   the test crucible further includes a first lid, and
   sealing the sample pan comprises press fitting the first lid to the sample pan.

16. The method of claim 14, wherein:
   the test crucible further includes a first lid and a second lid, and
   sealing the sample pan comprises:
      press fitting the first lid to the sample pan; and
      press fitting the second lid to the sample pan over the first lid.

17. The method of claim 14, wherein performing DSC testing includes increasing a temperature of the sample between a first temperature and a second temperature using one of a linear thermal ramp and a plurality of isothermal steps.

18. The method of claim 14, wherein:
   the test crucible further includes a first lid,
   the spacer includes a material selected from a group consisting of a polymer, gold, platinum, aluminum, nickel, stainless steel, and an oxide, and
   the insulating layer includes a material selected from a group consisting of a polymer film layer, a polymer gasket, and an insulating coating formed on at least one of the separator and the first lid.

19. The method of claim 14, wherein:
   the test crucible further includes a first lid, the sample pan and the first lid include mating threads, and sealing the sample pan comprises:

arranging a seal between the sample pan and the first lid; and fastening the first lid to the sample pan using the threads.

20. The method of claim 19, wherein the sample pan and the first lid include stainless steel and the seal includes gold.

* * * * *